June 16, 1959    F. B. WILLIAMSON, JR., ET AL    2,890,900
HOSE COUPLING HAVING LONGITUDINAL LOCKING MEANS
Filed June 27, 1955
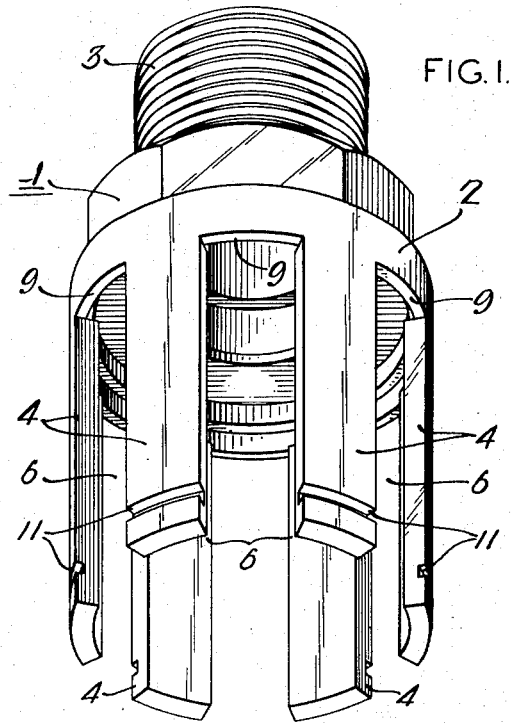
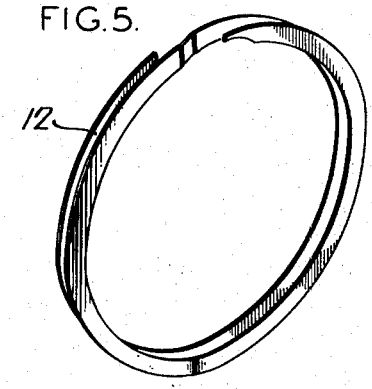
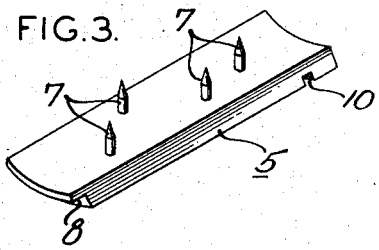
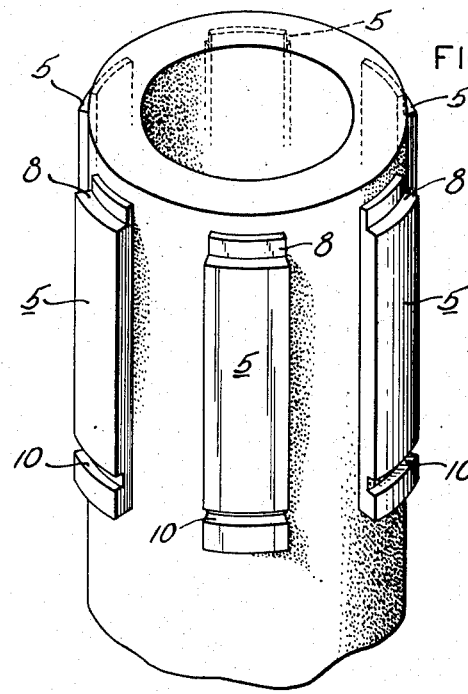
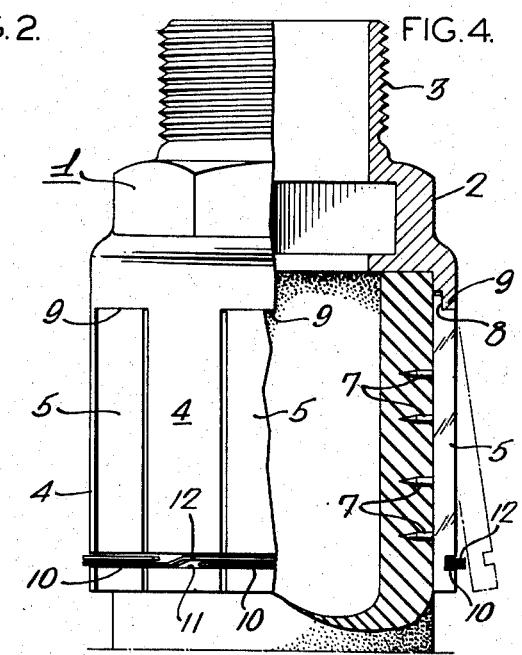
INVENTORS:
FREDERICK B. WILLIAMSON JR.
EDWARD V. HOLLAND JR.
BY Howson & Howson
ATTYS.

United States Patent Office 2,890,900
Patented June 16, 1959

2,890,900

HOSE COUPLING HAVING LONGITUDINAL LOCKING MEANS

Frederick B. Williamson, Jr., New Hope, Pa., and Edward V. Holland, Jr., Trenton, N.J., assignors to Goodall Rubber Company, Trenton, N.J., a corporation of New Jersey Application June 27, 1955, Serial No. 518,056

2 Claims. (Cl. 285—238)

This invention relates to improvements in hose couplings and a principal object of the invention is to provide a coupling of simplified and economical construction and which may be attached and detached from the hose with minimum expenditure of time and effort.

The invention relates more particularly to a type of coupling adapted for use with a hose having a wall structure inherently susceptible to distortion by externally applied radial pressures, and the coupling is designed to provide a secure union with a hose of this class without requiring imposition of material radial pressure on the hose body, or the use of a wall-supporting internal nipple in the hose end.

The invention also provides a novel coupling, suitable for many types of hose, which affords a secure anchoring of the coupling on the hose without requiring the use of a nipple or other internal part tending to obstruct or to reduce the passage through the hose body.

The invention will be more readily understood by reference to the attached drawings in which:

Fig. 1 is a view in perspective of the body member of a coupling made in accordance with the invention;

Fig. 2 is a view in perspective of the end of a section of hose with elements of the coupling attached;

Fig. 3 is a view in perspective of one of the anchoring elements;

Fig. 4 is a side and partial sectional view illustrating the coupling assembled with a hose section;

Fig. 5 is a view in perspective of the split retaining ring forming an element of the assembly.

With reference to the drawings the coupling may consist of a fitting, indicated in Fig. 1 by the reference numeral 1, which comprises a body member 2 of generally tubular form having, in the present instance, an externally threaded terminal portion 3 and a plurality of circumferentially spaced axial extensions 4 which together define the wall of a cylindrical socket adapted for reception of a hose end. The coupling comprises also a plurality of anchoring members or elements 5 (see Fig. 3) which are formed to fit within the spaces 6 between the extensions 4 and which have on their inner faces suitable means, such for example as spikes 7, for attachment of said elements to the hose. As shown in Fig. 4, one end of each of the anchor elements 5 is rabbetted, as indicated at 8, so as to fit under an overhanging lip 9 on the body member at the inner end of each of the spaces 6, the lip 9 thus confining the proximate end of the anchor element 5 and securing it against radially outward displacement.

Each of the elements 5 has at its opposite end and on the outer face a transverse groove or recess 10, and each of the extensions 4 is similarly recessed, as indicated at 11, so that when the elements 5 are in normal positions within the spaces 6, as shown in Fig. 4, the grooves or recesses 10 will register and be in circumferential alignment with the grooves or recesses 11 of the extensions 4. These aligned grooves constitute a means for securing the fitting 1 to the anchoring elements through the medium of a split ring 12 (see Figs. 4 and 5), which may be sprung into seating relation in the grooves 10 and 11 so as to interlock with and encircle both the extensions 4 and the interposed anchor elements 5. The ring 12 not only thus secures the fitting 1 to the elements 5, but confines the elements radially in positions wherein they remain attached to the hose body by way of the spikes 7. The fitting 1 is thus immobilized against displacement of any character with respect to the hose end. In effect the elements 5 are securely and positively anchored to the hose body, and the fitting 1 is in turn anchored to the elements 5 through the medium of the ring 12, so that the coupling and the hose are securely, but detachably joined together. This union of hose and coupling is effected without radial pressure tending to collapse or to materially distort the hose wall. It entirely eliminates requirement for use in the coupling structure of a nipple in the hose end to support or reinforce the wall of the hose, and avoids the obstructive effect inherent in the use of such nipples.

The generally tubular body portion of the coupling fitting may assume various forms other than that illustrated without departure from the invention and it is apparent also that other means may be employed for anchoring the elements 5 on the hose and to the fitting without departure from the spirit of the invention as defined in the appended claims.

We claim:

1. In a coupling for rubber hose, a tubular fitting for locking engagement with a complementary fitting on the exterior of an end portion of a section of said hose, said tubular fitting having at one end thereof a plurality of axial extensions arranged in spaced, parallel and circumferentially-extending series with a circumferentially-extending end wall between the inner ends of adjacent extensions to define closed inner ends for the spaces between said extensions, the outer ends of said extensions being circumferentially spaced to provide openings into the spaces between adjacent ones of said extensions, said extensions defining the wall of a cylindrical socket for reception of and direct contact with the outer surface of said end portion of said section of hose, a plurality of separate axially extending elements mounted on and in direct contact with the outer surface of said end portion in spaced, parallel and circumferentially-extending series complementary to said circumferentially-extending series of extensions on said tubular fitting and each having on its inner surface a plurality of spikes penetrating said end portion to thereby anchor said elements on said end portion against axial and circumferential displacement, said elements fitting individually within the respective spaces between said extensions when said end portion with said elements thereon is inserted within the cylindrical socket defined by said extensions, said extensions and elements having circumferential grooves on the outer faces thereof which register circumferentially when said elements occupy the spaces between said extensions, and means detachably seated in said registering grooves and circumferentially embracing said extensions and said elements to bind said elements against radial displacement from said end portion and to anchor said elements within the spaces between said extensions.

2. A hose coupling for rubber hose as defined in claim 1, wherein said registering circumferentially-extending grooves in said elements and extensions are adjacent the outer ends of said extensions, and wherein the circumferentially-extending end walls between the inner ends of adjacent extensions are provided with lips which overhang the ends of said elements which are opposite the ends in which said grooves are located to further confine said elements against radial displacement from said end portion.

References Cited in the file of this patent

UNITED STATES PATENTS

| | | |
|---|---|---|
| 889,786 | Keiner | June 2, 1908 |
| 1,054,812 | Zierath | Mar. 4, 1913 |
| 1,113,080 | Wilson | Oct. 6, 1914 |
| 1,882,616 | Hutchinson | Oct. 11, 1932 |
| 2,245,101 | Cole | June 10, 1941 |
| 2,439,161 | Du Bois | Apr. 6, 1948 |
| 2,475,057 | Shaber | July 5, 1949 |

FOREIGN PATENTS

| | | |
|---|---|---|
| 644,735 | Germany | May 12, 1937 |
| 585,222 | Great Britain | Feb. 3, 1947 |